(No Model.)
J. S. HILL.
TOWER WAGON.
No. 499,189. Patented June 6, 1893.
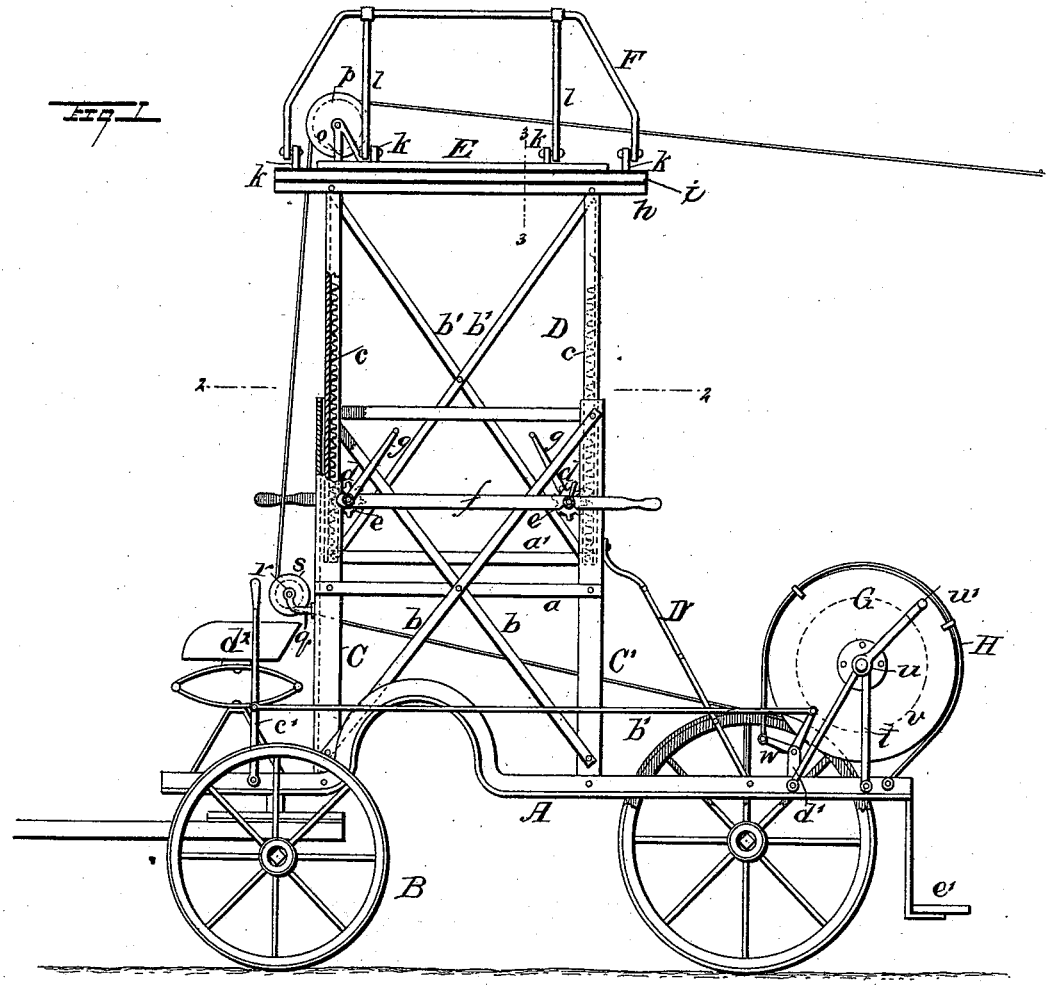
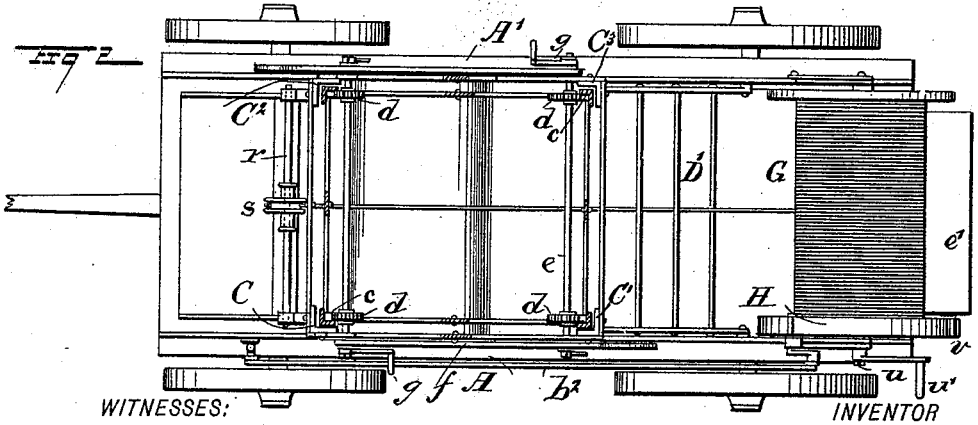
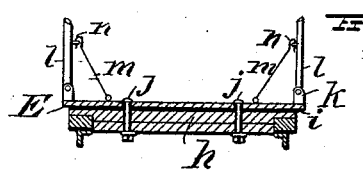
WITNESSES:
H. Walker
C. Sedgwick
INVENTOR
J. S. Hill
BY Munn & Co
ATTORNEYS.

UNITED STATES PATENT OFFICE.

JOSEPH S. HILL, OF LAFAYETTE, INDIANA.

TOWER-WAGON.

SPECIFICATION forming part of Letters Patent No. 499,189, dated June 6, 1893.

Application filed January 19, 1893. Serial No. 458,910. (No model.)

*To all whom it may concern:*

Be it known that I, JOSEPH S. HILL, of Lafayette, in the county of Tippecanoe and State of Indiana, have invented a new and Improved Tower-Wagon, of which the following is a specification, reference being had to the annexed drawings, forming a part thereof, in which—

Figure 1 is a side elevation, partly in section, of my improved tower wagon. Fig. 2 is a sectional plan view, the section being taken on line 2—2 in Fig. 1; and Fig. 3 is a transverse section on line 3—3 in Fig. 1.

Similar letters of reference indicate corresponding parts in all the views.

The object of my invention is to provide a tower wagon for stringing trolley wires for electric railways, and for putting up electric lines of every description.

My invention consists of an extensible tower mounted on a wagon and provided with an insulated platform for supporting the wagon, and in the combination with the tower, of a reel for holding the line wire, sheaves for guiding it, and a brake for controlling the reel, all as will be hereinafter more fully described.

The side bars A A' which are formed of T-iron and supported by the running gear B, are curved upwardly near the front end of the wagon, to allow the forward wheels to be turned under the wagon body. To the side bars A, A' are attached the uprights C, C', $C^2$, $C^3$, which are connected by cross bars $a$, and braces $b$, forming together with the said cross bars and braces, a rigid framework. To the frame thus formed is fitted a smaller frame D, formed of angle iron corner posts, cross bars $a'$ and braces $b'$. The uprights C, C', &c., form guides for the angle iron corner pieces of the frame D. The corner pieces of the frame D are provided with racks $c$, which are engaged by pinions $d$ on shafts $e$ journaled in cross-bars $f$ attached to the uprights C, C', &c., and the shafts $e$ are provided with cranks $g$ by means of which they may be turned when it is desired to elevate the frame D. To the top of the frame D are secured cross bars $h$, by which is supported the platform E, the said platform being separated from the bars $h$ by insulating material $i$, such as vulcanite or vulcanized fiber, and the platform is secured to the cross bars by bolts $j$, which are insulated. The platform E is provided with ears $k$, to which are pivoted the downwardly-bent ends of the rails F, and the standards $l$ which assist in supporting the rails F. Hooked braces $m$ are connected with the platform and engage eyes $n$ projecting from the standards $l$ when the rails F are unfolded and in the position of use.

To the platform E are secured standards $o$, in which is journaled the sheave $p$; and to the uprights C and $C^2$, are secured brackets $q$ in which is journaled the shaft $r$ carrying the sheave $s$. Standards $t$ are secured to the side bars A at the rear end of the wagon, and in the said standards is journaled the shaft $u$ of the reel G. The flange $v$ of the said reel is of sufficient thickness to receive the strap brake H, one end of which is secured to the side-bar A, the other end being pivoted to the shorter arm of the angled lever $w$, which is fulcrumed on a standard $d'$ secured to the side bar A. To the longer arm of the said lever is pivotally connected a rod $b'$, connected with the lever $c'$ pivoted to the side bar A, at the front of the wagon.

The wagon is provided with a driver's seat $d^2$, and is furnished at the rear with a platform $e'$ suspended from the side bar A. The reel shaft $u$ is provided with a crank $u'$. By means of this construction, the wire carried by the reel G may be paid out over the sheaves $s$, $p$, and any amount of tension may be given to the wire by applying the strap brake H, with more or less pressure to the flange of the reel.

The operator is protected from the action of the current by the insulation of the platform E, and also by the insulation afforded by the wooden spokes of the wheels of the wagon. A ladder D', attached to the side-bars A A' and secured to the uprights C', $C^3$, serves the double purpose of a brace and a means of ascending the tower.

Having thus described my invention, I claim as new and desire to secure by Letters Patent—

1. The combination, with wagon running gear, of an extensible tower provided at the top with an electrically insulated platform, substantially as specified.

2. The combination, with a wagon provided with upwardly-curved side bars, of an extensible tower, a reel for holding wire, and sheaves for guiding the wire over the top of the tower, substantially as specified.

3. The combination, with an extensible tower, of a reel for containing the wire, a strap brake partly surrounding one of the heads of the reel, levers for operating the brakes, and sheaves for guiding the wire over the tower, substantially as specified.

JOSEPH S. HILL.

Witnesses:
H. N. THROCKMORTON,
MAY BROOKS.